United States Patent
Wu et al.

[11] Patent Number: 6,131,444
[45] Date of Patent: Oct. 17, 2000

[54] MISFIRE DETECTION USING A DYNAMIC NEURAL NETWORK WITH OUTPUT FEEDBACK

[75] Inventors: Zhijian Wu, Rochester Hills; Anson Lee, St. Clair, both of Mich.

[73] Assignee: Chrysler Corporation, Auburn Hills, Mich.

[21] Appl. No.: 09/153,592

[22] Filed: Sep. 15, 1998

[51] Int. Cl.[7] .................................................. G01D 18/00
[52] U.S. Cl. ............................................. 73/116; 73/117.3
[58] Field of Search ......................... 73/117.3; 701/111; 382/105; 706/20

[56] References Cited

U.S. PATENT DOCUMENTS

| | | |
|---|---|---|
| 5,109,695 | 5/1992 | James et al. . |
| 5,193,513 | 3/1993 | Marko et al. . |
| 5,298,796 | 3/1994 | Tawel . |
| 5,299,285 | 3/1994 | Tawel . |
| 5,305,635 | 4/1994 | James et al. . |
| 5,365,780 | 11/1994 | Feldkamp . |
| 5,392,643 | 2/1995 | O'Kennedy et al. . |
| 5,469,825 | 11/1995 | Golab et al. . |
| 5,495,415 | 2/1996 | Ribbens et al. ................. 73/117.3 |
| 5,513,620 | 5/1996 | Pyko et al. . |
| 5,528,929 | 6/1996 | Ikebuchi . |
| 5,531,108 | 7/1996 | Feldkamp et al. . |
| 5,559,285 | 9/1996 | Bryant et al. . |
| 5,587,524 | 12/1996 | Hampo et al. . |
| 5,645,745 | 7/1997 | Hartwick et al. . |
| 5,648,602 | 7/1997 | Hosina et al. . |
| 5,699,253 | 12/1997 | Puskorius et al. ................. 73/117.3 |
| 5,717,133 | 2/1998 | Wu et al. . |
| 5,731,834 | 3/1998 | Huot et al. . |
| 5,732,382 | 3/1998 | Puskorius et al. . |
| 5,744,722 | 4/1998 | Wu et al. . |
| 5,745,653 | 4/1998 | Jesion et al. . |
| 5,802,844 | 9/1998 | Lee et al. . |
| 5,819,197 | 10/1998 | Wu et al. . |
| 5,862,507 | 1/1999 | Wu et al. ................................. 701/111 |

OTHER PUBLICATIONS

NASA's Jet Propulsion Laboratory, Pasadena, California, "Neuroprocessor for Detecting Misfire in an Automotive Engine", NASA Tech Briefs, Dec. 1997, pp. 60–61.

Primary Examiner—Eric S. McCall
Assistant Examiner—Octavia Davis
Attorney, Agent, or Firm—Mark P. Calcaterra

[57] ABSTRACT

A misfire detection apparatus and method for detecting misfire of an engine. The engine has an engine speed and a manifold absolute pressure. An engine signal preprocessing system is provided for determining: a fluctuation associated with the engine speed; an average associated with the engine speed; and an average associated with the manifold absolute pressure. A neural network determines a firing event signal based upon: the determined engine speed fluctuation; the determined engine speed average; and the determined manifold absolute pressure average. A misfire decision determinator detects a misfire of the engine based upon the determined firing event signal. A preferred embodiment also includes a dynamic neural network system with global output feedback.

20 Claims, 13 Drawing Sheets

MISFIRE DETECTION USING A DYNAMIC NEURAL NETWORK WITH OUTPUT FEEDBACK

BACKGROUND OF THE INVENTION

1. Technical Field

The present invention relates generally to internal combustion engines and, more particularly to, an automobile engine misfire detection system.

2. Discussion

Misfiring of an automobile engine results in increased emissions into the atmosphere and potential damage of the catalyst. The California Air Resources Board requires that all light duty vehicles be equipped with on-board misfire detectors. Such requirements have spurred much research in misfire detection methods.

A difficulty in the development of an on-board real time misfire detector is the determination of an unified algorithm to detect misfires with high detection accuracy and with no false alarms while maintaining a low implementation cost, under all required engine operating conditions and misfire patterns. These operating conditions include, but are not limited to, different engine speeds, engine loads, road surfaces, gear positions, mechanical dynamics. Furthermore, misfire patterns may be regular, random or special sequences. Because of these challenges, various misfire detection algorithms and methods have been researched and studied in the automotive companies, suppliers, universities and various research institute around the world.

Current methods include those based on such engine characteristics as the engine speed or crankshaft speed. These methods are utilized because of signal availability, overall low implementation cost, and adequate detection performance under most conditions. The typical crankshaft speed based misfire detection methods typically include "frequency" components and engine roughness analysis methods. There are also model based torque and cylinder pressure profile reconstruction methods.

SUMMARY OF THE INVENTION

The present invention provides a method and system for detecting engine misfire in an internal combustion engine. The engine has an engine speed and a manifold absolute pressure. An engine signal preprocessing system is provided for determining: a fluctuation associated with the engine speed; an average associated with the engine speed; and an average associated with the manifold absolute pressure. A neural network determines a firing event signal based upon: the determined engine speed fluctuation; the determined engine speed average; and the determined manifold absolute pressure average. A misfire decision determinator detects a misfire of the engine based upon the determined firing event signal.

BRIEF DESCRIPTION OF THE DRAWINGS

Other objects and advantages of the invention will become apparent upon reading the following detailed description and upon reference to the drawings, in which.

DETAILED DESCRIPTION THE PREFERRED EMBODIMENT

Figure 1:
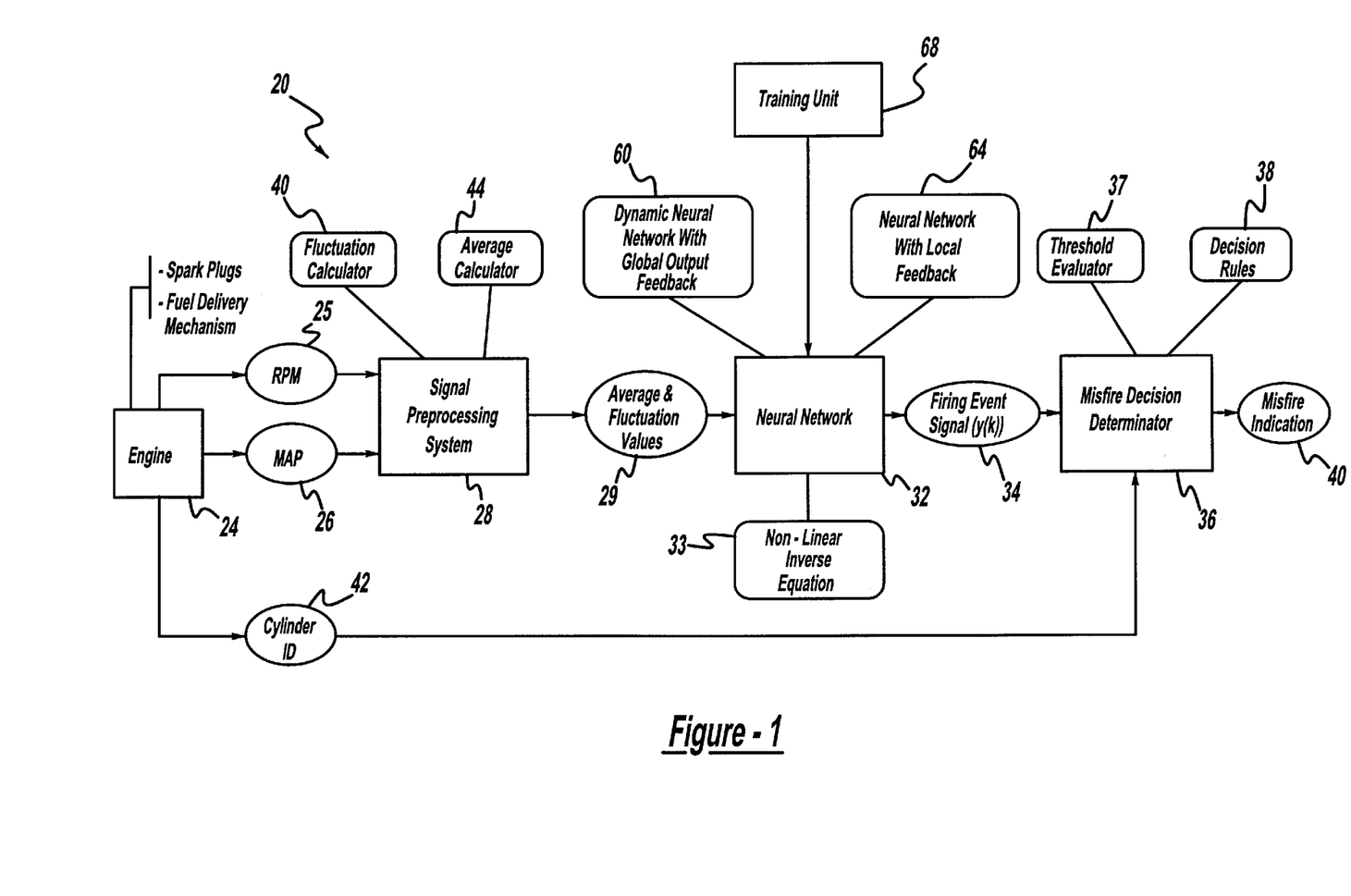
FIG. 1 is a block diagram depicting the components of the novel misfire detection system.

FIG. 1 depicts the components of a novel engine misfire detection system 20. Predetermined characteristics of an operating engine 24 are processed by signal preprocessing system 28 for input into a neural network 32 for subsequent misfire detection by a misfire decision determinator 36.

More particularly, the engine speed (as expressed as revolutions per minute—RPM) 25 and the manifold absolute pressure (MAP) 26 are inputted into signal preprocessing system 28. The data for the engine speed and MAP are sampled evenly in a crankshaft angular domain. Within signal preprocessing system 28, the fluctuation and average signal components are extracted respectively via fluctuation calculator 40 and average calculator 44. Fluctuation calculator 40 and average calculator 44 extract these components from the original signals using conventional filtering techniques. The average and fluctuation values 29 are provided by signal preprocessing system 28 to neural network 32. In the preferred embodiment of the present invention, neural network 32 utilizes the following approach.

In an internal combustion engine, air and fuel mixture in the cylinders are ignited periodically by sparks generating torque and the rotation of the crankshaft. In normal operation, the engine speed or the angular speed of the crankshaft mainly depends on engine operating conditions and its loads. However, when engine misfire occurs due to the absence of spark in a cylinder or poor fueling, the crankshaft speed will fluctuate.

Within the preferred embodiment of neural network 32, the engine combustion process and mechanical dynamics are described as a nonlinear dynamic system. The event of normal firing or misfire is considered as an input which excites the system while the crankshaft speed fluctuation is a system output response. Once an inverse system is identified from the crankshaft speed fluctuation signal to the firing event signal with a well defined wave form, the engine misfire is detected more accurately from the output of the inverse system given the engine speed as the input of the inverse system, because in part the output signal has a higher signal to noise ratio for the misfire signature than its input signal. Moreover, the present invention utilizes the fact that the current crankshaft speed is related to the current and previous firing events and also the previous speeds.

The misfire detection system is expressed in the preferred embodiment as a general difference equation (or relationship) in crankshaft angular sampling domain k:

$$\tilde{N}(k)=H(\underline{\tilde{N}}, \underline{\overline{N}}, \underline{\overline{P}}, \underline{I}) \quad \text{(equation 1)}$$

where $\underline{\tilde{N}} = [\tilde{N}(k-1), \tilde{N}(k-2), \ldots, \tilde{N}(k-n_f)]$ $\underline{\overline{N}} = [\overline{N}(k), \overline{N}(k-1), \ldots, \overline{N}(k-n_a)]$ $\underline{\overline{P}} = [\overline{P}(k), \overline{P}(k-1), \ldots, \overline{P}(k-m_a)]$ $\underline{I} = [I(k), I(k-1), \ldots, I(k-l)]$ In the above equation $\tilde{N}$ denotes the crankshaft speed fluctuation, $\overline{N}$ the average crankshaft speed, $\overline{P}$ the average manifold absolute pressure (MAP), l the firing event signal, and $n_f$, $n_a$, $m_a$ are integers representing the samples in the past. The average components of the crankshaft speed and MAP are used in the model to compensate the variation of the speed fluctuation due to the different engine operating and load conditions.

The inverse model 33 corresponding to the above crankshaft speed model may be described in a general form as follows:

$$I(k)=G(\underline{I}, \underline{\tilde{N}}, \underline{\overline{N}}\, \underline{\overline{P}}) \quad \text{(equation 2)}$$

where $\underline{I} = [I(k-1), I(k-2), \ldots, I(k-l)]$ $\underline{\tilde{N}} = [\tilde{N}(k), \tilde{N}(k-1), \ldots, \tilde{N}(k-n_f)]$ $\underline{\overline{N}} = [\overline{N}(k), \overline{N}(k-1), \ldots, \overline{N}(k-n_a)]$ $\underline{\overline{P}} = [\overline{P}(k), \overline{P}(k-1), \ldots, \overline{P}(k-m_a)]$ This equation (or relationship) implies that the current firing event signal is preferably inversely estimated from the current and past values of the crankshaft speed fluctuation, the average crankshaft speed component and the average MAP components as well as the previous firing events. This is a nonlinear discrete dynamic system with three inputs and one output. In general, it is very difficult to derive the detail form of the nonlinear dynamic function G which is why a neural network is preferably used for this function.

Figure 2:
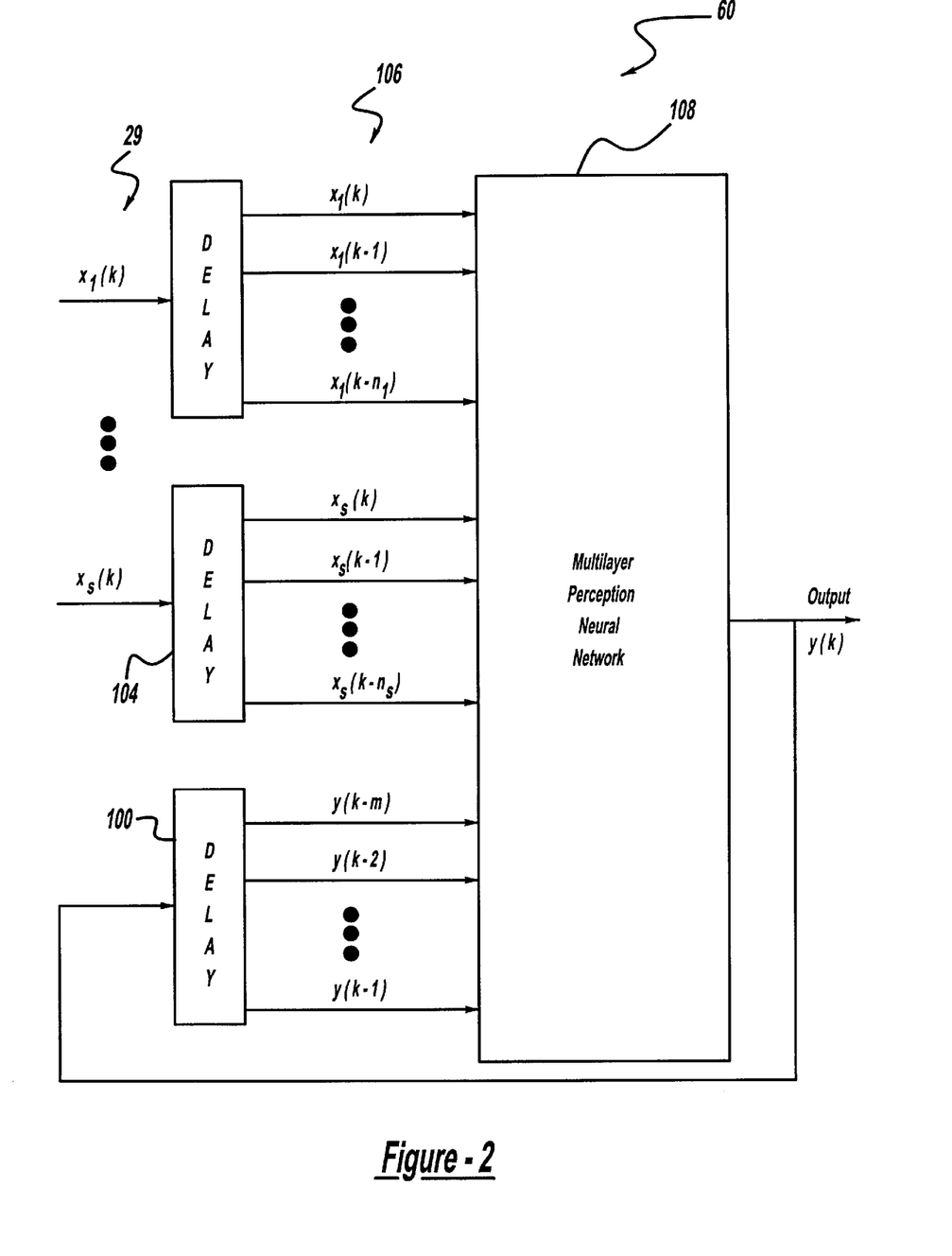
FIG. 2 is a block diagram of a dynamic neural network system with output feedback.
Figure 3:
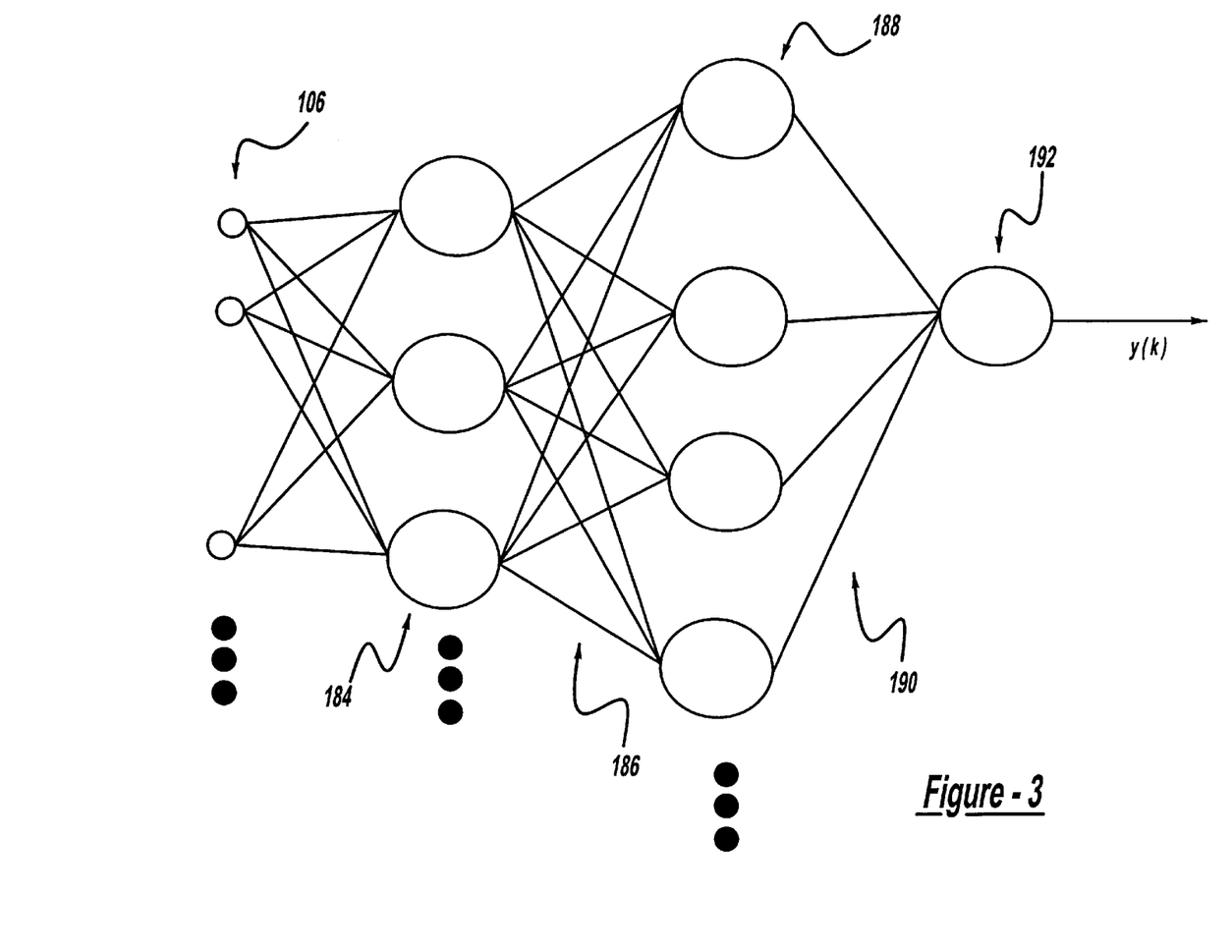
FIG. 3 is an exemplary implementation of the neural network of FIG. 2.

With reference to FIG. 2, the outputs 29 of signal preprocessing system are provided to a neural network system which in the preferred embodiment is a dynamic neural network system with global output feedback 60. A system with feedback is advantageous in dynamic modeling because of its efficiency and performance over purely forward systems. Dynamic neural network system 60 which feeds back the output of the network through a tapped-delay line 100 is used for nonlinear system identification and control. This kind of network architecture is suitable to model multi-input and multi-output nonlinear dynamic systems and is trained with input and output data from practical applications of operating engines. Preferably the neural network system utilizes a multilayer perceptron neural network 108. Perceptron neural network 108 provides output y(k) which represents the firing event signal to the misfire decision determinator (and whose preferred embodiment is depicted in FIG. 3).

Input signals 29 on FIG. 2 are provided to such tapped-delay lines as tapped delay line 104. Tapped-delay lines produce outputs 106 which serve as inputs to perceptron neural network 108. Mathematically, the neural network system is expressed as:

$$y(k)=F[y(k-1), \ldots, y(k-m), x_1(k), \ldots, x_1(k-n_1), \ldots, x_s(k), \ldots, x_s(k-n_s)] \quad \text{(equation 3)}$$

The preferred embodiment directly modifies the back propagation learning rule to train the network.

A comparison between equation 2 and equation 3 results in the following that when s=3, the inverse model has the same system form as described by equation 3. Thus, a three-input and single output dynamic neural network is preferably utilized in the application for misfire detection.

The main computational load is from the neural network which, in turns, depends on the number of neuron layers and the numbers of their inputs and neurons. For the preferred embodiment, a two layer fully connected neural network (e.g., a neural network with a hidden layer and an output layer) is used.

In addition to preparing the feedforward signals $\tilde{N}$, $\overline{N}$, and $\overline{P}$, the engine's sequential firing events representing two states, normal or misfire, are transformed to a proper wave form for the network training. A preferred requirement for the waveform selection is that first, the waveform to be selected makes the misfire decision less complex and robust; and secondly, the waveform is favorable to small network size.

For the low data rate case of one data point per firing event, for instance, the firing event can be transformed to a bipolar signal with +1 and −1 that represents normal firing and misfire, respectively. For the cases of more than one data points per firing event, there are more options to choose the wave forms. For instance, the rectangular wave form representing the firing events can be transformed into a low pass signal or the band-limited signals as used for base brand transmission in the digital communication field. The misfire detection system of the present invention includes the engine being connected to spark plugs and a fuel delivery mechanism for producing firing events. The present invention allows the engine speed and manifold absolute pressure to be sampled at a sampling rate of approximately one sampled data point per firing event in order to detect misfires.

FIG. 3 provides an example of multilayer perceptron neural network 108 which provides output y(k). Input layer nodes 184 receive data from inputs 106. Hidden layer nodes 188 are activated or deactivated based upon weights 186 as determined through prior training.

Output layer nodes 192 process the results of hidden layer 188 in accordance with their own trained weights 190. The output of output layer nodes 192 is y(k).

However, with reference back to FIG. 1, it is to be understood that the present invention is not limited to solely a dynamic neural network structure with a global output feedback 60, but also includes a neural network with a local feedback 64. One such implementation of neural network with local feedback 64 is described in U.S. Pat. No. 5,745,653 entitled "Generic Neural Network Training and Processing System."

A neural network training unit 68 is used for off-line training of the neural network 32. The training is based on the input and output data of the dynamic system. These data are collected under different engine operating conditions and misfire patterns to achieve the best performance.

As described above, the preferred dynamic neural network used here is constituted from a feedforward network and feedback of the output of the network. One of the reasons this configuration was chosen is that the rules for static feedforward network can be utilized for training the dynamic neural network with minimum modifications. In training each epoch of the network training, a set of time sequential data are applied to the network to get each layer's response with temporarily "frozen" network weights, then based on the network output's squared error thereof the weights at each layer are updated and used for the training in the next epoch.

Preferably, a backpropagation learning rule with an adaptive learning rate is used to speed up the training process. In the application of misfire detection, a relatively large amount of data for different engine operations and misfire patterns are generally required to train the network. To further improve the training efficiency and results, M sets of sequential data segments which are located in different time periods are randomly selected from the training data files and then applied to the network in each epoch in a similar manner of batching operation used in the static feedforward network. The size of sets, M, may be changed in the whole training process.

The misfire indication output 40 by misfire decision determinator 36 is based on output 34 of the neural network by comparing a preset threshold via threshold evaluator 37 or utilizing decision rules 38.

With the synchronized cylinder identification signal 42, the specific cylinder number can be identified if a misfire occurs. Once the neural network is trained, the decision is made sequentially for each firing event. If there are more than one input data sample per firing event, then a decimation process before the decision making or a multiple point decision strategy is performed to realize one decision per firing event. In the field of the invention, the term "decimation" signifies the following: reducing the sampling frequency from "n" to "m" data points where n is a multiple of m.

Figure 4:
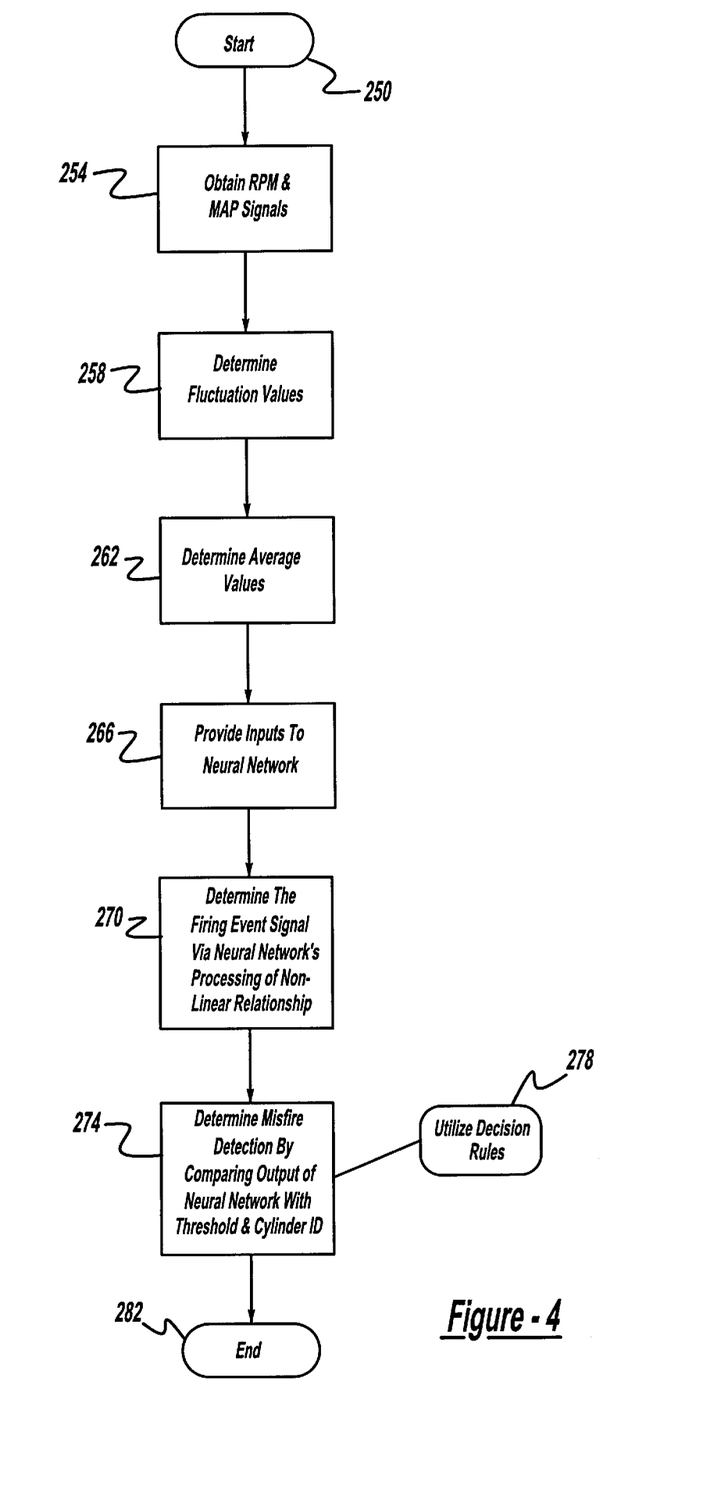
FIG. 4 is a flowchart depicting the process steps for determining engine misfire within the present invention.

FIG. 4 depicts the processing steps associated with the novel engine misfire detection system and method. Start indication block 250 indicates that process block 254 is to be executed. Process block 254 obtains the engine RPM speed and MAP signals from an engine that had been operated or is currently being operated. Process block 258 determines the engine speed fluctuation, and process block 262 determines the average values of the engine speed and the MAP.

Process block 266 provides these determined values to the aforementioned neural network system which at process block 270 determines the firing event signal via processing of the preferred non-linear inverse equation. Process 274 detects engine misfire by comparing the output of the neural network with respect to a predetermined threshold and with the appropriate cylinder identifier. In the preferred embodiment, the predetermined threshold is a constant and is preferably the value zero. Moreover, in an alternate embodiment, the misfire detection decision may utilize decision rules as indicated by process block 278. Preferably, the decision rules include look-up tables, statistical decision and/or expert systems. Processing terminates at end block 282.

FIGS. 5a–13b are non-limiting examples of the application of the present invention to a four cylinder engine for the purpose of detecting misfire. The data used in the examples were sampled evenly in a crankshaft angular domain. The sampling rate of the crankshaft speed was relatively low, that is, one data point per firing event. This indicates one data point for a 180 degree rotation of the crankshaft in a 4-cylinder engine. The low data rate crankshaft speed is available in existing vehicle engine controllers.

According to the signal analysis, the useful signatures for misfire detection are located within a specific limited angular frequency band. When the low data sampling rate is used, the interested signatures occupy all of its Nyquist frequency domain if all the possible misfire patterns are considered. Thus, the low sampling rate itself limits the application of the frequency filtering technique to enhance the signal to noise ratio. When the frequency filtering is applied to the low rate data, the signal to noise ratio may be enhanced for some misfire patterns, but at the same time the useful information in the data may be filtered out for other misfire patterns such as two cylinder misfire patterns and high percentage random misfire patterns.

In the present invention, the signal to noise ratio is enhanced for various misfire patterns and engine operating conditions even for the low rate data when the data pass through the dynamic neural network.

In the present invention's examples depicted in FIGS. 5a–13b and listed in the following tables, the engine speed ranges about 800 (idle) to 6000 RPM and the MAP ranges about 200 to 760 Torr (that is, wide open throttle position). The data were collected within these operating ranges for normal firing without any induced misfire and four misfire patterns that include the 16% and 100% random misfire patterns, as well as multiple cylinder #1 and #4 continuous misfire pattern. A total of 270 data files that represent all the combinations of the engine operating conditions and misfire patterns were used in the examples. These data files recorded a total of approximately $10^5$ firing events.

For the two layer perceptron neural network, the hidden layer had a total of twelve inputs and fifty neuron nodes. This set-up of the network corresponds to the parameter in equation 2 as follows: $n_f=5$, $n_a=1$, $m_a=1$ and $l=5$. The output layer had a total of fifty inputs and one neuron node. The firing events were transformed to a bipolar signal in the training phase. The training data were combined with first half data from each data files. After the network was trained, the data in all the files were evaluated with the misfire detection system shown in FIG. 1. The misfire decision was made through a fixed threshold comparison.

Figure 5A:
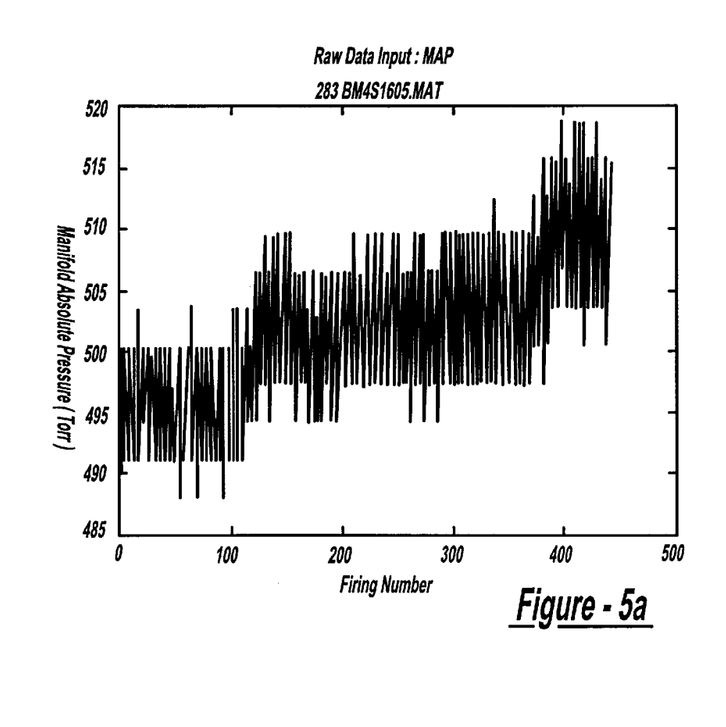
FIGS. 5a and 5b are x-y graphs which respectively depict the raw input MAP and RPM data into the signal preprocessing system of the present invention in a first exemplary application.
Figure 5B:
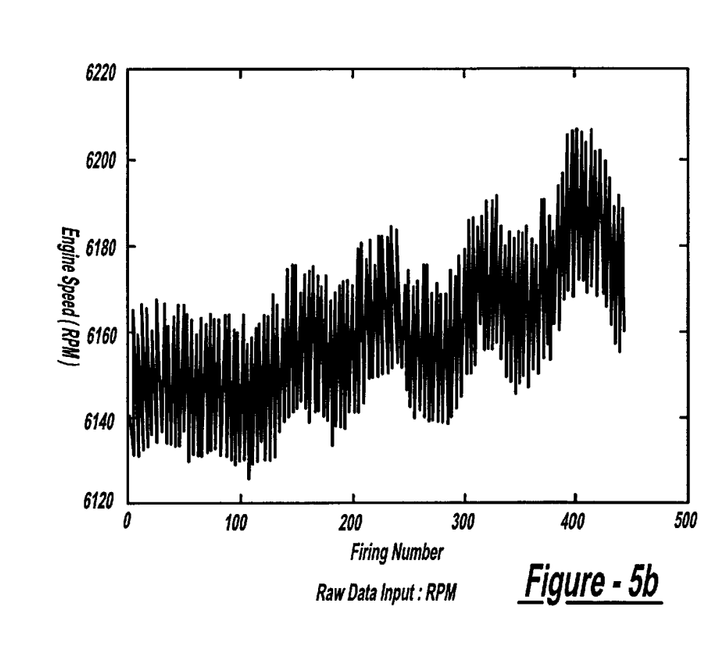

FIGS. 5a–7b are graphs associated with a first exemplary application of the present invention with the conditions of: 6000 RPM; 500 Torr; and 100% Cylinder #1 (which indicates that Cylinder #1 is not operational—that is, the vehicle is operating only on three cylinders—and there is 25% misfire for the overall system). FIGS. 5a and 5b respectively depict the raw input MAP and RPM data into the signal preprocessing system of the present invention.

Figures 6A, 6B, 6C:
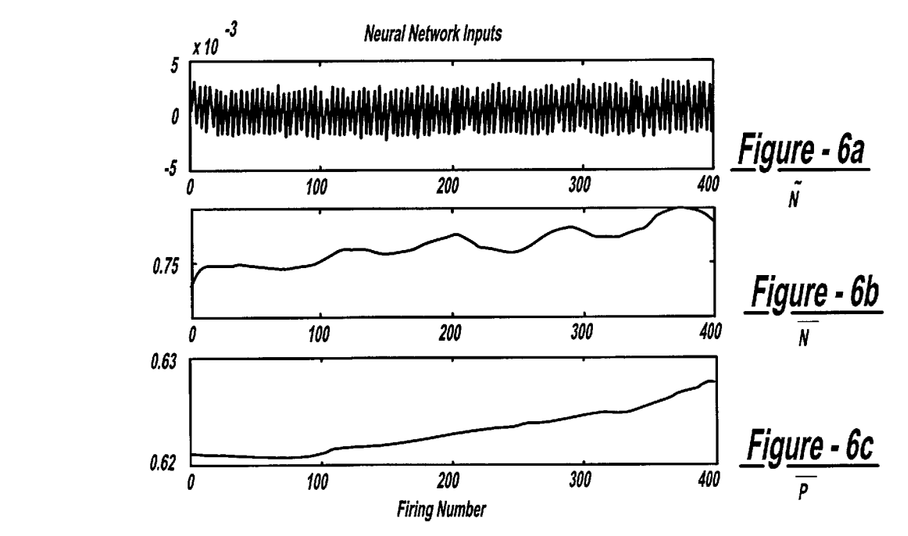
FIGS. 6a–6c are x-y graphs which depict the inputs from the signal preprocessing system to the neural network of the present invention in a first exemplary application.
Figure 6D:
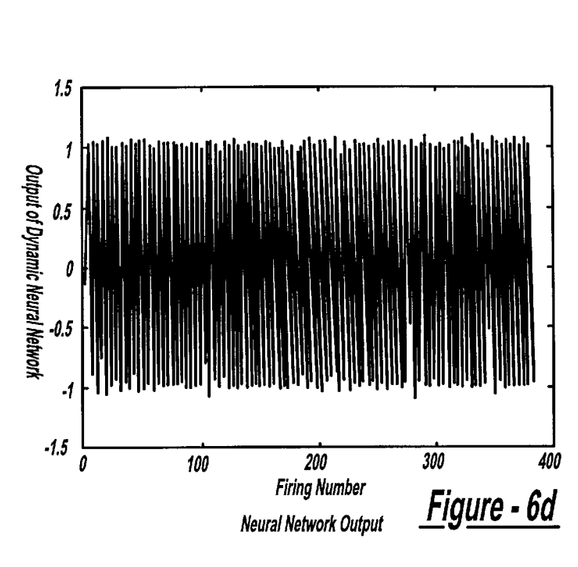
FIG. 6d is an x-y graph which depicts the output of the neural network where the output of the neural network is plotted versus the firing number in a first exemplary application.

FIGS. 6a–6c depict the inputs from the signal preprocessing system to the neural network of the present invention. FIG. 6a depicts the crankshaft speed fluctuation versus firing number. FIG. 6b depicts the average crankshaft speed versus firing number. FIG. 6c depicts the average manifold absolute pressure versus firing number. FIG. 6d depicts the output of the neural network where the output of the neural network is plotted versus the firing number.

Figure 7A:
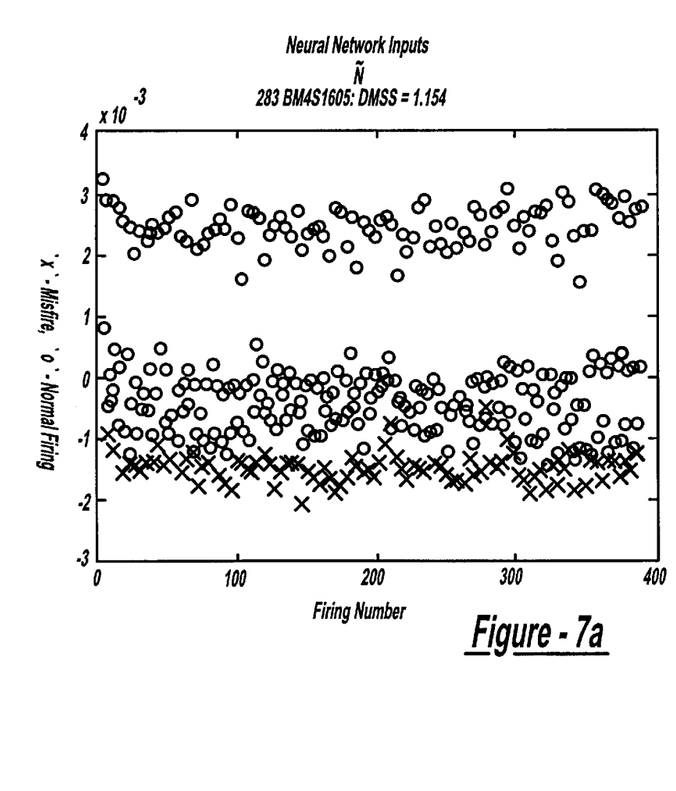
FIG. 7a is an x-y graph which depicts the misfire and normal firing signatures by plotting the neural network input crankshaft speed fluctuation versus firing number in a first exemplary application.
Figure 7B:
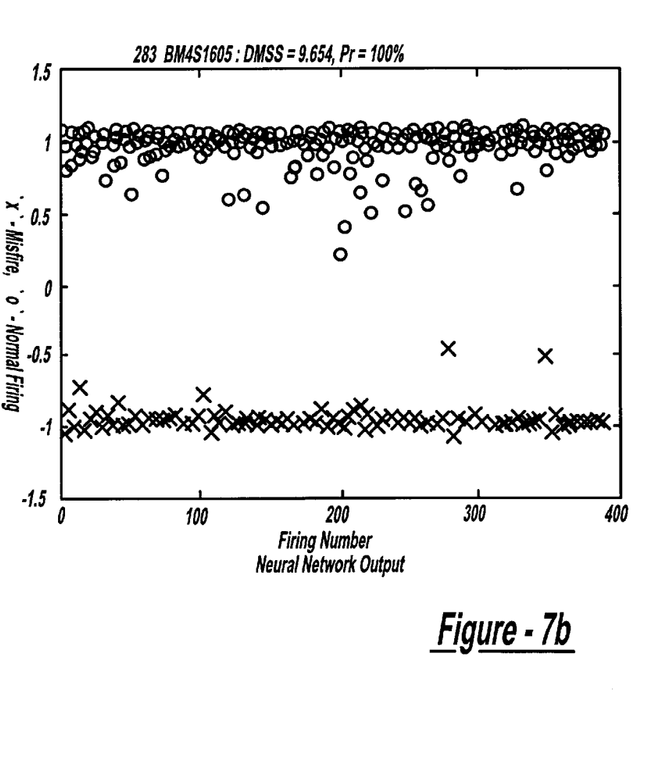
FIG. 7b is an x-y graph which depicts the output of the misfire decision detection determinator after it had applied a threshold in a first exemplary application.

FIG. 7a illustrates the misfire and normal firing signatures by plotting the neural network input crankshaft speed fluctuation versus firing number where "X" denotes a misfire and "O" denotes a normal firing. FIG. 7b depicts the output of the misfire decision detection determinator after it has applied a threshold of zero. FIG. 7a illustrates the difficulty of identifying before processing via the neural network the misfires from normal firings since they too appear so close together. FIG. 7b illustrates how well the neural network was able to identify the misfires from normal misfires as the graph of FIG. 7b shows much better separation between the two.

Figure 8A:
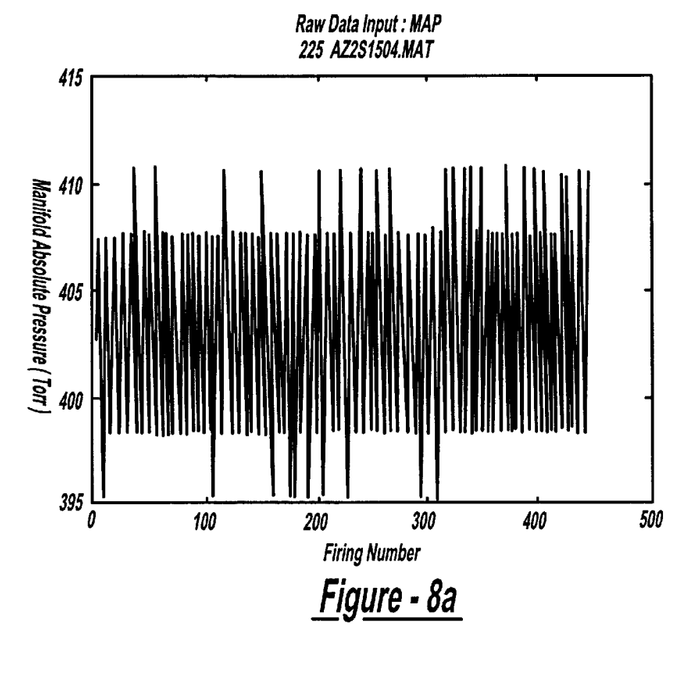
FIGS. 8a and 8b are x-y graphs which respectively depict the raw input MAP and RPM data in to the signal preprocessing system of the present invention in a second exemplary application.
Figure 8B:
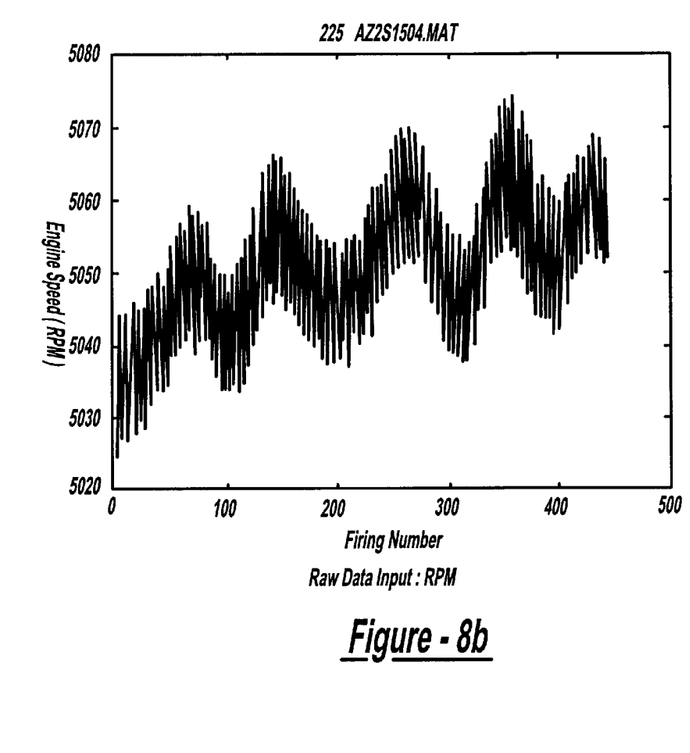

FIGS. 8a–9b are graphs associated with a second exemplary application of the present invention with the conditions of: 5000 RPM; 400 Torr; and 100% Cylinder #1. FIGS. 8a and 8b respectively depict the raw input MAP and RPM data into the signal preprocessing system of the present invention.

Figure 9A:
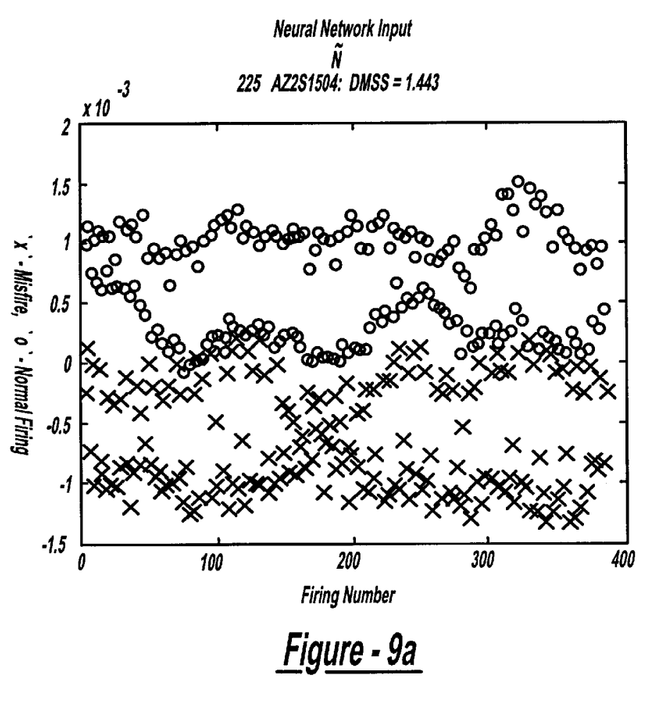
FIG. 9a is an x-y graph which depicts the misfire and normal firing signatures by plotting the neural network input crankshaft speed fluctuation versus firing number in a second exemplary application.
Figure 9B:
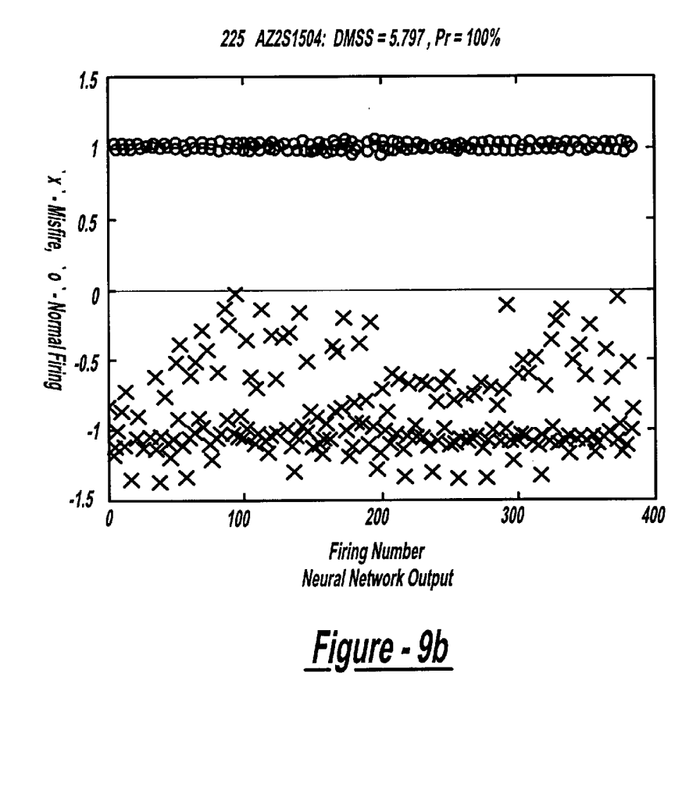
FIG. 9b is an x-y graph which depicts the output of the misfire decision detection determinator after it had applied a threshold in a second exemplary application.

FIG. 9a illustrates the misfire and normal firing signatures by plotting the neural network input crankshaft speed fluctuation versus firing number where "X" denotes a misfire and "O" denotes a normal firing. FIG. 9b depicts the output of the misfire decision detection determinator after it has applied a threshold of zero.

Figure 10A:
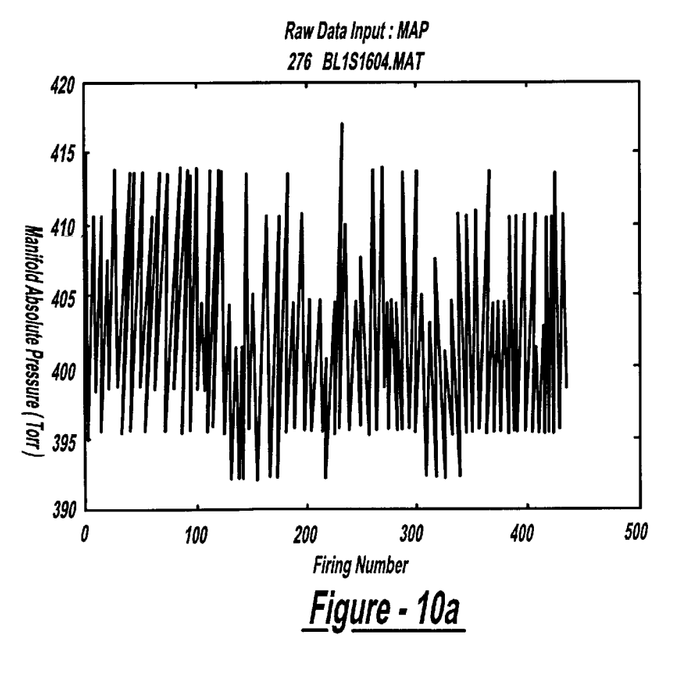
FIGS. 10a and 10b are x-y graphs which respectively depict the raw input MAP and RPM data into the signal preprocessing system of the present invention in a third exemplary application.
Figure 10B:
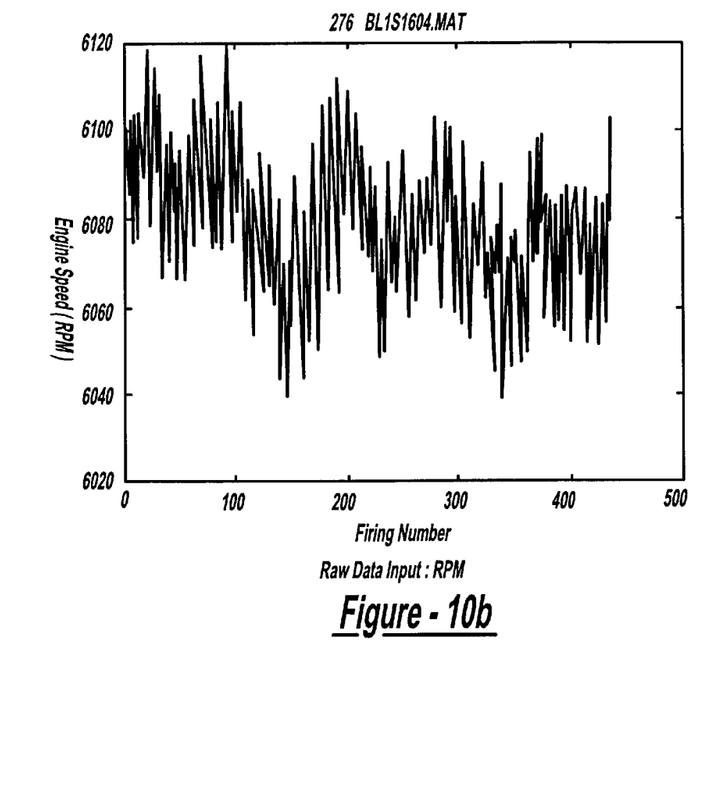

FIGS. 10a–11b are graphs associated with a third exemplary application of the present invention with the conditions of: 6000 RPM; 400 Torr; and 100% "Random" which signifies the following: one random cylinder of the four cylinders is not firing). FIGS. 10a and 10b respectively depict the raw input MAP and RPM data associated with the third example into the signal preprocessing system of the present invention.

Figure 11A:
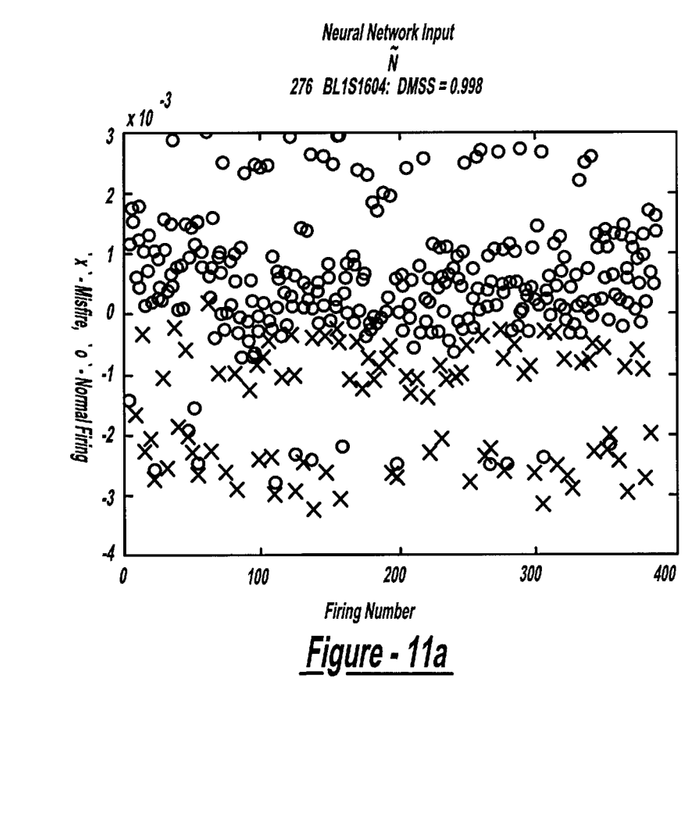
FIG. 11a is an x-y graph which depicts the misfire and normal firing signatures by plotting the neural network input crankshaft speed fluctuation versus firing number in a third exemplary application.
Figure 11B:
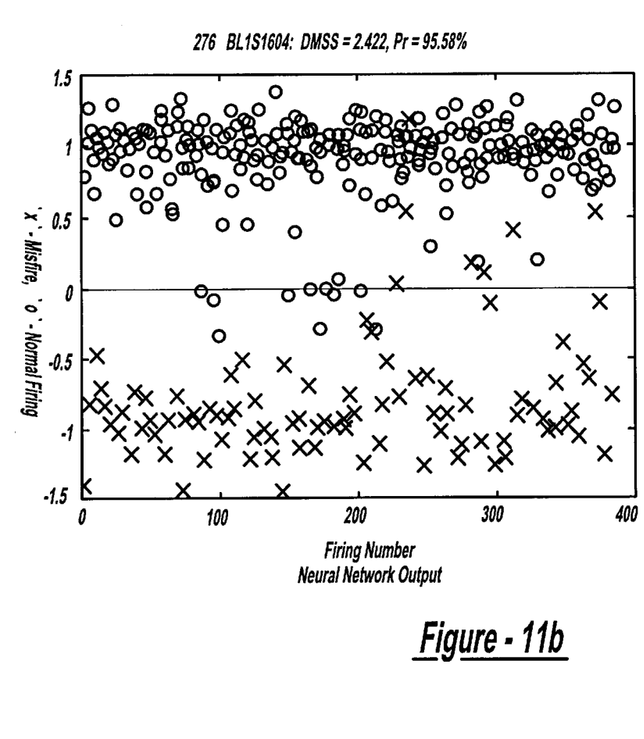
FIG. 11b is an x-y graph which depicts the output of the misfire decision detection determinator after it had applied a threshold in a third exemplary application.

FIG. 11a illustrates the misfire and normal firing signatures by plotting the neural network input crankshaft speed fluctuation versus firing number where "X" denotes a misfire and "O" denotes a normal firing. FIG. 11b depicts the output of the misfire decision detection determinator after it has applied a threshold of zero.

Figure 12A:
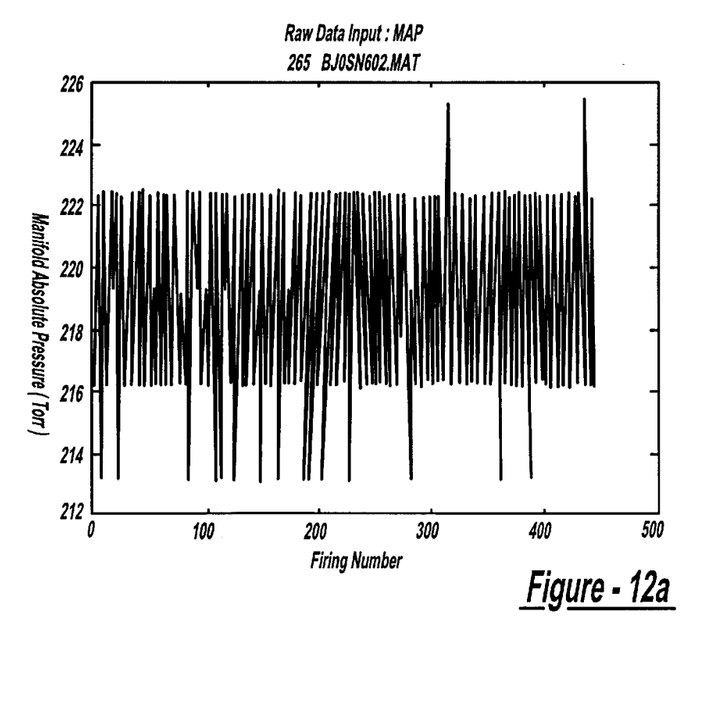
FIGS. 12a and 12b are x-y graphs which respectively depict the raw input MAP and RPM data into the signal preprocessing system of the present invention in a fourth exemplary application.
Figure 12B:
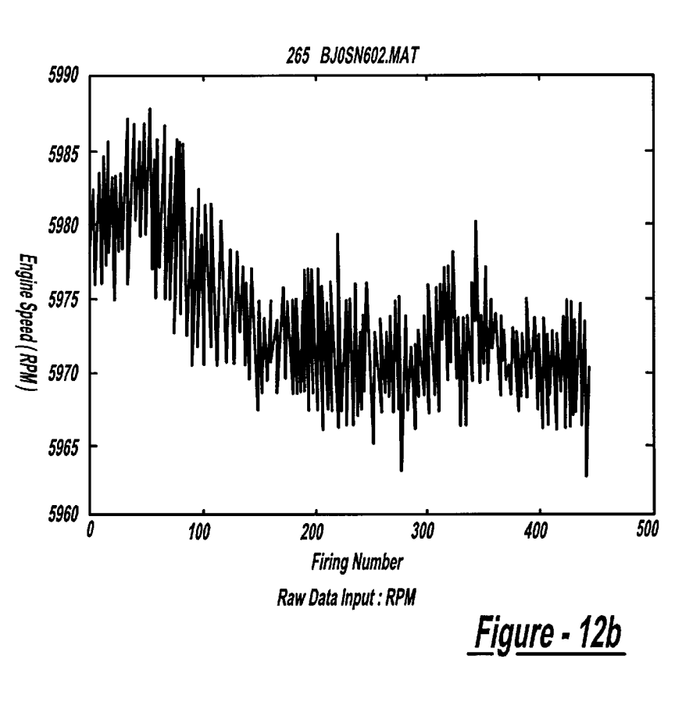

FIGS. 12a–13b are graphs associated with a fourth exemplary application of the present invention with the conditions of: 6000 RPM; Idle; and no misfire induced. FIGS. 12a and 12b respectively depict the raw input MAP and RPM data associated with the fourth example into the signal preprocessing system of the present invention.

Figure 13A:
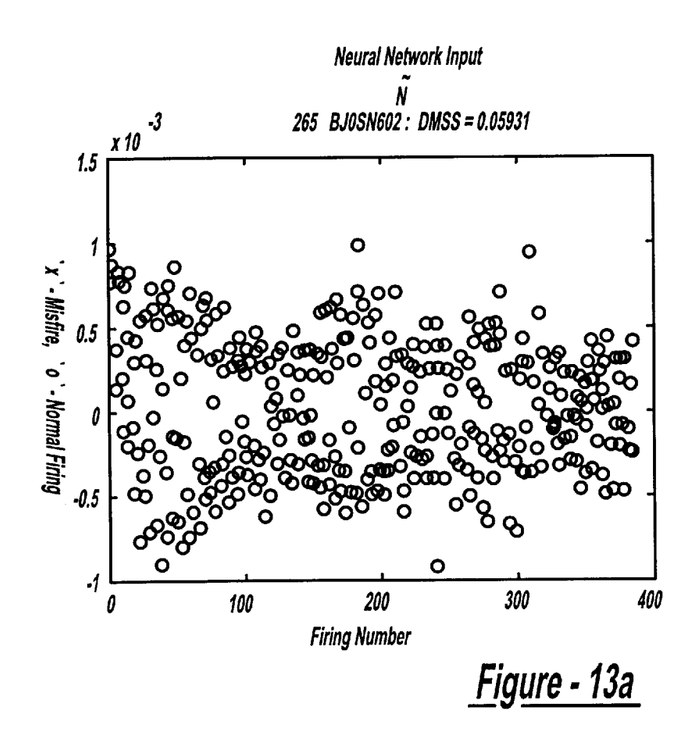
FIG. 13a is an x-y graph which depicts the misfire and normal firing signatures by plotting the neural network input crankshaft speed fluctuation versus firing number in a fourth exemplary application.
Figure 13B:
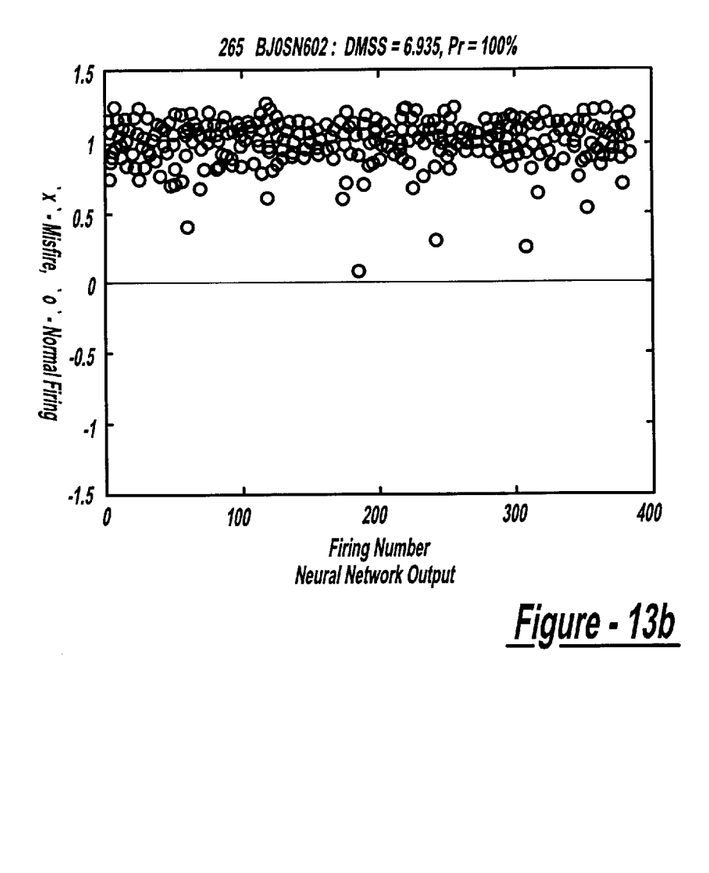
FIG. 13b is an x-y graph which depicts the output of the misfire decision detection determinator after it had applied a threshold in a fourth exemplary application.

FIG. 13a illustrates the misfire and normal firing signatures by plotting the neural network input crankshaft speed fluctuation versus firing number where "X" denotes a misfire and "O" denotes a normal firing. FIG. 13b depicts the output of the misfire decision detection determinator after it has applied a threshold of zero.

Listed in the following table is a summary of the misfire detection performance for the low rate data using the present invention. The numbers in the central portion of the table indicate the total probability of detection which is defined as:

$$\Pr = p_0(1-P_f) + p_1 P_d \qquad \text{(equation 4)}$$

where $p_0$ and $p_1$ represent the a priori probabilities of normal firing events and misfire events, respectively. $P_f$ and $P_d$ represent the probability of a false alarm (i.e., whether the misfire is present when it is really not present) and the probability of detection (i.e., the misfire is present when it is indeed present), respectively. The total probability of detection is approximated in the real evaluation as the ratio of the total correctly detected both normal firing and misfire events and the total firing events. The total probability of detection for all the RPMs and misfire patterns discussed above is 98.5%.

| | Misfire Patterns | | | | |
|---|---|---|---|---|---|
| Pr(%) RPM | No misfire | 100% random | #1 & #4 cylinders | 16% random | #1 cylinder |
| 1000 | 99.85 | 99.07 | 100 | 99.11 | 100 |
| 2000 | 95.93 | 99.97 | 99.97 | 99.64 | 99.86 |
| 3000 | 99.98 | 99.77 | 100 | 99.98 | 99.77 |
| 4000 | 100 | 98.01 | 96.65 | 99.83 | 98.44 |
| 5000 | 99.86 | 95.7 | 93.24 | 98.63 | 100 |
| 6000 | 98.51 | 95.73 | 98.34 | 98.8 | 91.86 |

Various other advantages of the present invention will become apparent to those skilled in the art after having the benefit of studying the foregoing text and drawings taken in conjunction with the following claims.

It is claimed:

1. A misfire detection apparatus for detecting misfire of an engine, said engine having an engine speed and a manifold absolute pressure, comprising:

an engine signal preprocessing system for determining a fluctuation associated with the engine speed and an average associated with the engine speed and an average associated with the manifold absolute pressure;

an input to a neural network for providing as an input to the neural network the determined engine speed fluctuation, said neural network determining a firing event signal based upon said determined engine speed fluctuation and upon said determined engine speed average and upon said determined manifold absolute pressure average; and a misfire decision determinator for detecting a misfire of the engine based upon said determined firing event signal.

2. The misfire detection apparatus of claim 1, wherein said neural network includes a global output feedback, said feedback including said determined firing event signal.

3. The misfire detection apparatus of claim 2, wherein said neural network includes an input layer for receiving inputs to said neural network, said global output feedback being an input into said input layer of said neural network.

4. The misfire detection apparatus of claim 1, wherein said neural network uses a non-linear inverse relationship that determines as an output current firing event signal that is inversely estimated from current and past values of the determined engine speed fluctuation, the average engine speed, and the average manifold absolute pressure.

5. The misfire detection apparatus of claim 4, wherein said neural network evaluates said non-linear inverse relationship with current and past values of said determined engine speed fluctuation.

6. The misfire detection apparatus of claim 1, wherein said neural network includes a hidden layer for processing inputs to said neural network, said neural network including a local feedback of said determined firing event signal into said hidden layer of said neural network.

7. The misfire detection apparatus of claim 1 further comprising:

a neural network training unit for training said neural network to produce neural network weight parameters in accordance with a non-linear inverse relationship which interrelates a firing event signal with said determined engine speed fluctuation and with said determined engine speed average and with said determined manifold absolute pressure average.

8. The misfire detection apparatus of claim 1 further comprising:

a threshold evaluator connected to said misfire decision determinator for comparing said determined firing event signal with a predetermined threshold in order to detect a misfire of the engine.

9. The misfire detection apparatus of claim 1 further comprising:

decision rules connected to said misfire decision determinator for providing said misfire decision determinator with predetermined rules for comparing said determined firing event signal with a predetermined threshold in order to detect a misfire of the engine.

10. The misfire detection apparatus of claim 1, wherein an identifier is associated with cylinders of the engine speed, said misfire decision determinator utilizing said cylinder identifier to identify which cylinder of the engine has exhibited a misfire.

11. The misfire detection apparatus of claim 1, wherein the engine is connected to spark plugs and a fuel delivery mechanism for producing firing events, said engine speed and a manifold absolute pressure being sampled at a sampling rate of approximately one sampled data point per firing event.

12. A misfire detection apparatus for detecting misfire of an engine, said engine having an engine speed and a manifold absolute pressure, comprising:

an engine signal preprocessing system for determining engine speed data of said engine, said engine speed data including a fluctuation associated with engine speed;

an input to a global dynamic neural network for providing as an input to the neural network the determined fluctuation, said global dynamic neural network with output feedback determining a firing event signal based upon said determined engine speed data, said feedback including said determined firing event signal; and a misfire decision determinator for detecting a misfire of the engine based upon said determined firing event signal.

13. The misfire detection apparatus of claim 12, wherein said dynamic neural network includes an input layer for receiving inputs to said dynamic neural network, said global output feedback being an input into said input layer of said dynamic neural network.

14. The misfire detection apparatus of claim 12, wherein said engine signal preprocessing system determines a fluctuation associated with the engine speed and an average associated with the engine speed and an average associated with the manifold absolute pressure, said dynamic neural network including a non-linear inverse relationship which interrelates a firing event signal with said determined engine speed fluctuation and with said determined engine speed average and with said determined manifold absolute pressure average.

15. The misfire detection apparatus of claim 14, wherein said dynamic neural network evaluates said non-linear inverse relationship with current and past values of said determined engine speed fluctuation.

16. A method for detecting misfire of an engine, said engine having an engine speed and a manifold absolute pressure, comprising the steps of:

determining a fluctuation associated with the engine speed and an average associated with the engine speed and an average associated with the manifold absolute pressure;

providing the determined engine speed fluctuation and engine speed average and manifold absolute pressure average as inputs to a neural network, said neural network determining a firing event signal based upon said determined engine speed fluctuation and upon said determined engine speed average and upon said determined manifold absolute pressure average; and detecting a misfire of the engine based upon said determined firing event signal.

17. The method of claim 16 further comprising the step of:

providing a global output feedback to said neural network, said feedback including said determined firing event signal produced from said neural network, said neural network including an input layer for receiving inputs to said neural network, said global output feedback being an input into said input layer of said neural network.

18. The method of claim 16 further comprising the step of:

processing by said neural network a non-linear inverse relationship which interrelates a firing event signal with said determined engine speed fluctuation and with said determined engine speed average and with said determined manifold absolute pressure average.

19. The method of claim 16, wherein the engine is connected to spark plugs and a fuel delivery mechanism for producing firing events, wherein an identifier is associated with cylinders of the engine, said method further comprising the steps of:

sampling the engine speed and manifold absolute pressure of said engine at a sampling rate of approximately one sampled data point per firing event;

comparing said determined firing event signal with a predetermined threshold in order to detect a misfire of the engine; and utilizing said cylinder identifier to identify which cylinder of the engine has exhibited a misfire.

20. The method of claim 16 further comprising the step of:

providing predetermined rules for comparing said determined firing event signal with a predetermined threshold in order to detect a misfire of the engine.

* * * * *